United States Patent
Hatanaka et al.

(10) Patent No.: US 6,404,471 B1
(45) Date of Patent: Jun. 11, 2002

(54) REFLECTION LIQUID CRYSTAL DISPLAY

(75) Inventors: Takayuki Hatanaka; Shingo Fujita; Tetsu Ogawa, all of Ishikawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/806,271

(22) PCT Filed: Sep. 27, 1999

(86) PCT No.: PCT/JP99/05245

§ 371 (c)(1),
(2), (4) Date: Jun. 22, 2001

(87) PCT Pub. No.: WO00/19267

PCT Pub. Date: Apr. 6, 2000

(30) Foreign Application Priority Data

Sep. 29, 1998 (JP) .............................. 10-276076

(51) Int. Cl.⁷ .............................. G02F 1/1335
(52) U.S. Cl. .................. 349/113; 349/96; 349/112; 349/117
(58) Field of Search .......................... 349/113, 96, 112, 349/117

(56) References Cited

U.S. PATENT DOCUMENTS 6,088,117 A * 7/2000 Imura et al.
6,266,111 B1 * 7/2001 Kataoka et al.

FOREIGN PATENT DOCUMENTS

JP 59081625 * 5/1984

* cited by examiner

*Primary Examiner*—Kenneth Parker
*Assistant Examiner*—Julie Ngo
(74) *Attorney, Agent, or Firm*—Ratner & Prestia

(57) ABSTRACT

A reflection-type liquid crystal display device comprises a liquid crystal cell, a polarizing film, a birefringent film, a scattering layer, and a light reflection means, in which a diffuse reflection factor "R" of the scattering layer is designed to be 7% or greater, but 110% or less when an incident angle of light is in the range of 25° or greater and 45° or smaller. Here the diffuse reflection factor "R" is defined by the formula of R=R1/R2×100 (where R1 is a reflection factor irradiated at an incident angle of 0°, and R2 is a reflection factor irradiated at an incident angle of 25°). This structure is able to provide a reflection-type LCD which is bright in White display, capable of producing a high contrast, and reducing blur of an image.

16 Claims, 14 Drawing Sheets

Reference Numerals

10. Scattering membrane
11. Polarizing film
12. Birefringent film
13. Liquid crystal cell
14. Upper transparent substrate
15. Color filter
16. Transparent electrode
17. Liquid crystal layer
18. Regular reflection plate
19. Lower substrate

REFLECTION LIQUID CRYSTAL DISPLAY

THIS APPLICATION IS A U.S. NATIONAL PHASE APPLICATION OF PCT INTERNATIONAL APPLICATION PCT/JP99/05245.

FIELD OF THE INVENTION

The present invention relates to a reflection-type liquid crystal display device.

BACKGROUND OF THE INVENTION

With the rapid spread of data communications apparatuses such as cellular phones, PHS's, PDA's (personal digital assistants), and the like, infrastructure has been coming to be in good order for anyone to get access and communicate readily at anytime and anywhere. Since these apparatuses are designed for use with mobility, which require display devices of light weight, thin, and low power consumption, liquid crystal display devices have become the dominating components at present. Such a liquid crystal display device provides a display with liquid crystal molecules that change transmission factor of light when being driven by several volts of effective voltage. However, since the liquid crystal is non-luminescent material, it requires another form of light source. Such a light source needs to be supplied with very large electric power as compared to electric power for driving the liquid crystal. On the other hand, a reflection-type liquid crystal display device (hereinafter referred to as "reflection-type LCD") takes extremely low power consumption, and realizes a display device that makes the best use of a feature inherent to the liquid crystal, as it is provided with a reflection plate underside of it to help display by using surrounding light. The reflection-type LCD is coming to be indispensable as a kind of displays for the personal digital assistants and the like.

However, the reflection-type LCD of the prior art has had a problem of not being capable of providing sufficient brightness in all directions other than a direction of the specular reflection of incident light to the display device, because it uses the surrounding light to display. For this reason, there has been suggested a structure in that a scattering film or the like is used to diffuse light toward other directions than that of the specular reflection in order to expand viewing angle.

The one described in Japanese Patent Laid-open Publication H08-201802 (hereinafter referred to as "prior art structure A"), and another having a scattering feature provided by asperities formed on an upper substrate, etc. described in Japanese Patent Laid-open Publication H08-338993 (hereinafter referred to as "prior art structure B"), for examples, have been known as some of the reflection-type LCD's of the prior art. FIG. 5 shows a configuration of the reflection-type LCD having the prior art structure A.

In the above-described prior art structure A and the prior art structure B, there still exist various problems depending on scattering characteristic of a scattering film used for each configuration.

If the scattering characteristic is weak, i.e. low in diffuse reflection factor, there is hardly any light reflected toward a front direction (direction normal to the LCD surface) of the reflection-type LCD of the prior art structure A or the prior art structure B, since the light incident upon it is scarcely scattered, but reflected toward a direction of the specular reflection, thereby giving rise to a problem that it displays very dark white.

On the other hand, if the scattering characteristic is intense, or the diffuse reflection factor is high, there occurs backward scattering upon incidence of the surrounding light on the reflection-type LCD of the prior art structure B, which is provided with the scattering characteristic by asperities of its substrate. Since this prevents the reflection factor from being sufficiently low in a black display, it also gives rise to another problem of not providing a high contrast. Furthermore, apart from the case of the prior art structure B, in the case of a configuration in the prior art structure A, which uses a front scattering film, multiple scattering can occur within the scattering film when light passes through it, because the scattering characteristic is intense. This changes a polarizing state of the transmitting light at its entry into the film as opposed to outgoing from the film. This results in a failure to prove a good black display with a low reflection factor, and thereby giving rise to a problem of not providing a high contrast.

Moreover, if the scattering characteristic is excessively intense in the above-said prior art structure A and the prior art structure B, the light diffused upon departing from the scattering film or a scattering layer formed with asperities gives rise to still another problem causing an image to appear blurred.

A reflection-type LCD of another structure has been suggested, in that a scattering layer is arranged between a polarizing film and a liquid crystal layer, as means to solve the above problems. However, even the above-described structure could not solve the problems for some devices while it could for the others, so that there had been a desire for detailed structural conditions to be established so as to solve the above problems reliably.

DISCLOSURE OF THE INVENTION

The present invention pertains to a reflection-type LCD comprising a liquid crystal cell, a polarizing film, a birefringent film, a scatteringlayer, and a light reflection means, wherein the scattering layer has a diffuse reflection factor "R" of 7% or greater but 110% or less when an incident angle is in the range of 25° or greater and 45° or less.

Provided that the diffuse reflection factor "R" used here is defined by the following formula:

$$R = R1/R2 \times 100$$

The R1 and R2 are defined as follows. Prepared first is an aluminum regular reflection plate, of which a reflection factor in a direction of the normal line is 91% to incident light of 546 nm in wave length having an incident angle (an angle with respect to the normal line of an object) of 0°. A reflection factor to a direction of the normal line is assumed to be R1, when light is irradiated at an incident angle of 0° to the object scattering layer adhered onto the aluminum regular reflection plate. Also, a reflection factor to a direction of the normal line with respect to an MgO layer having a thickness equal to that of the object adhered to the aluminum regular reflection plate is assumed to be R2, when light is irradiated to the MgO layer at an incident angle of 25°.

By adopting the structure as set forth above, there can be provided the reflection-type LCD capable of realizing excellent black and white display, thereby producing a high contrast and a clear image without blur of the image.

Further, the present invention is characterized by the scattering layer of which the diffuse reflection factor "R" is 60% or greater at the incident angle of 25°.

In addition, the scattering layer of this invention has a total light transmission factor of 80% or greater for incident light from a direction of the normal line to the scattering-layer. According to this structure, there can be produced not only good white display with a higher reflection factor, but also excellent black display with a low reflection factor, because of a reduced backward scattering, thereby realizing an image of improved visibility.

Furthermore, the scattering layer of this invention is characterized by being isotropic in the scattering characteristic. With this structure, there can be realized an excellent black and white display in a front direction of the reflection-type LCD without dependent upon a direction of light incident on the LCD, thereby achieving a high contrast and a clear image without blur of the image.

Moreover, the scattering layer of this invention is characterized by further having adhesiveness. By adopting this structure, there can be provided with scattering characteristic in the adhesive portion used for bonding the reflection-type LCD. This can reduce an overall thickness of the reflection-type LCD as compared with the one employing a scattering layer formed separately in a film configuration. In addition, by adopting the adhesive scattering layer formed between a liquid crystal cell and a birefringent film, the adhesive layer is not separately needed. This can shorten a distance between the scattering layer and a reflecting surface, and thereby the blur of image can be reduced.

THE BEST MODES FOR CARRYING OUT THE INVENTION

Exemplary embodiments of the present invention will be described hereinafter with reference to the accompanying figures.

First Exemplary Embodiment

Figure 1:
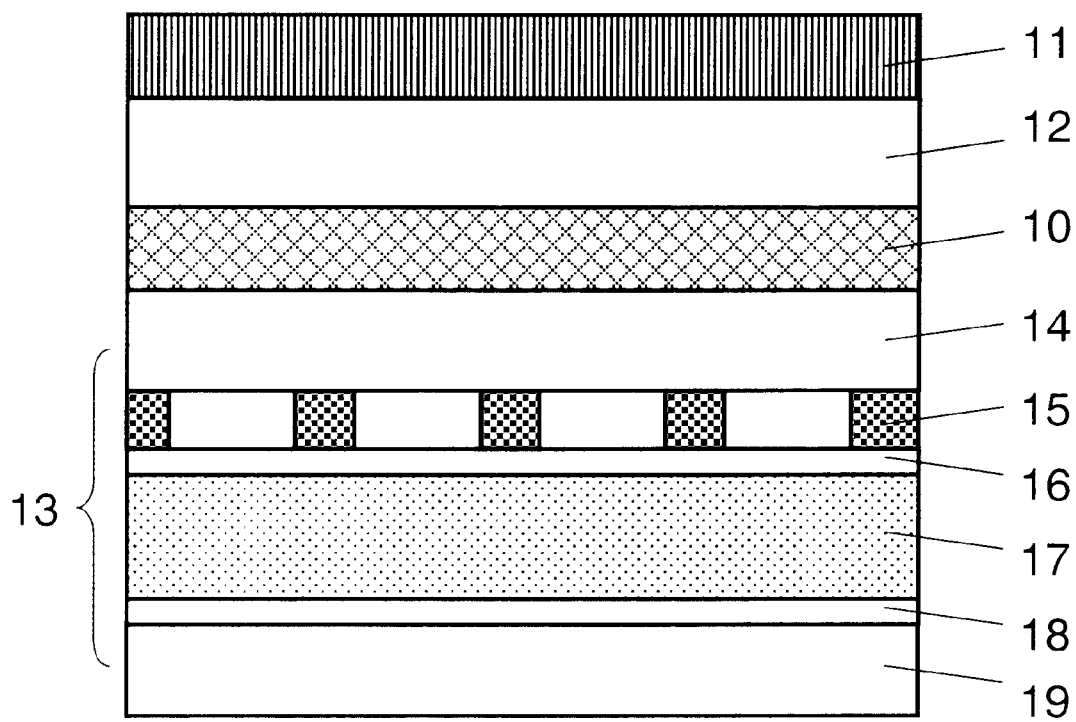
FIG. 1 is a sectional view of a reflection-type LCD of a first and second exemplary embodiments of the present invention.
Figure 2:
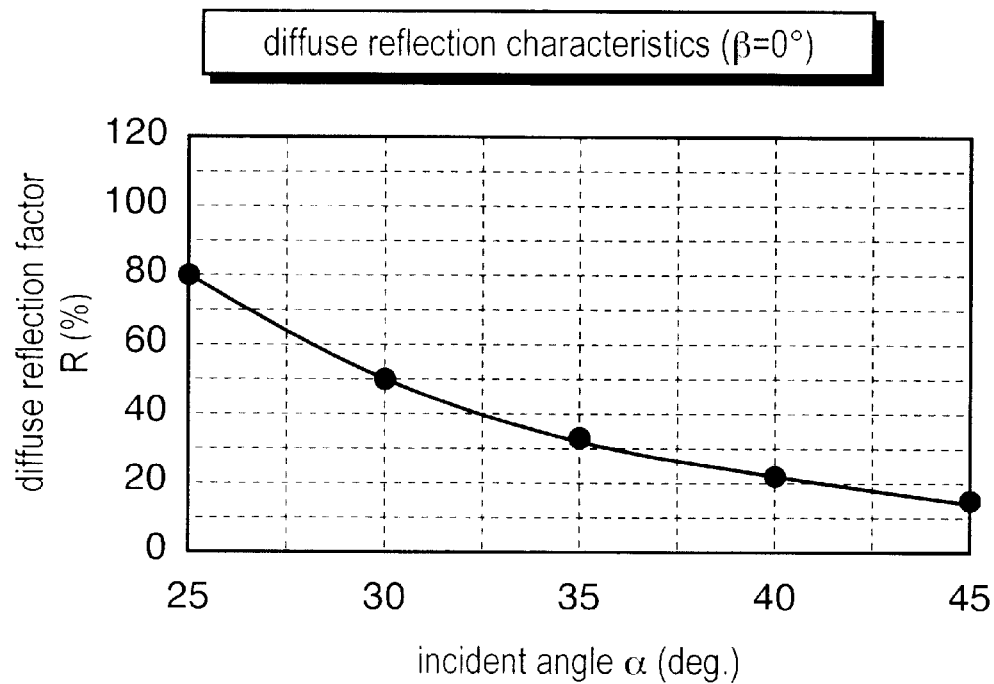
FIG. 2 is a graphical representation of scattering characteristic of a scattering layer of a reflection-type LCD of a first embodied example of this invention.

FIG. 1 is a sectional view of a reflection-type LCD of a first exemplary embodiment of this invention. As shown in FIG. 1, the reflection-type LCD of this exemplary embodiment comprises:

- a liquid crystal cell 13 containing liquid crystal sealed in-between an upper transparent substrate 14 and a lower substrate 19;
- a polarizing film 11 arranged on a side of the substrate 14 of the liquid crystal cell 13;
- a birefringent film 12 and a scattering layer 10 arranged between the polarizing film 11 and the liquid crystal cell 13; and
- a light reflection means (mirror reflection electrode 18) arranged on a side of the substrate 19 of the liquid crystal cell 13.

In this exemplary embodiment, a scattering layer having such a scattering characteristic that a diffuse reflection factor "R" is 7% or greater but 110% or less for incident light coming from any angle between 25° and 45° is used as the scattering layer 10 of the reflection-type LCD constructed as above. A bright white display can be attained if the diffuge reflection factor is 7% or greater.

In addition, an excellent black display with low reflection factor can be attained, since polarization is hardly canceled within the scattering layer if the diffuse reflection factor is 110% or less. As a result, a display of high contrast can be realized. Furthermore, there can be attained a reduction of blur in an image resulting in a clear image. A concrete example will be described later in the "embodied examples".

Further, backward scattering can be suppressed by using a scattering layer of which a total light transmission factor is 80% or greater. Hence, a reflection factor for black display can be reduced, and an excellent image with high visibility can be attained. Furthermore, use of a scattering layer having an isotropic scattering characteristic realizes excellent black and white display in a front direction of the reflection-type LCD without dependent upon a direction of light incident upon the LCD. This can result in attaining a high contrast and a clear image without causing blur of the image.

The scattering layer 10 is usually manufactured by way of dispersing fine particles of organic and inorganic substances into a resin. In this invention, the scattering layer was made by controlling diameters and a concentration of the fine particles included in the scattering layer, so as to achieve such characteristic that the diffuse reflection factor "R" becomes 7% or greater but 110% or less. Method of controlling the scattering characteristic is not limited to what is described above. But the scattering characteristic of the scattering layer can also be controlled by other means such as adjusting a thickness of the film, changing a difference in refractive index between the fine particles and a surrounding material, and so on.

The diffuse reflection factor for incident light coming from the angle of 25° corresponds to the case that the reflection-type LCD is used in an environment where there is a window of large area behind a user of the reflection-type LCD. Also, the diffuse reflection factor, in the case of the incident angle of 45°, corresponds to the case that the reflection-type LCD is used in an environment where there is a lighting fixture only above the user. Under the actual use environment, brightness of the reflection-type LCD depends on the diffuse reflection factor corresponding to the incident light at an incident angle of 25° to 45°. It is of great significance to control those diffuse reflection factors with respect to the incident light upon determination of a display characteristic of the reflection-type LCD. In particular, the diffuse reflection factor to the light at the incident angle of 25° carries the greatest significance upon the display characteristic of the reflection-type LCD, as this incident angle is closest to the specular reflection toward a front direction of the LCD.

Second Exemplary Embodiment

A second exemplary embodiment of this invention will be described next by referring to the accompanying figures. The present exemplary embodiment is similar to the first exemplary embodiment described above referring to FIG. 1, except that a scattering layer 10 of this invention has adhesiveness. Therefore, those elements not specifically described in this exemplary embodiment shall be taken as analogous to those of the first exemplary embodiment, and they are assigned the same reference numerals as the first exemplary embodiment in the following description.

The reflection-type LCD of this exemplary embodiment has a sectional structure identical to the structure shown in FIG. 1. In this exemplary embodiment, however, the scattering layer 10 also serves as an adhesive layer for bonding a birefringent film 12 and a liquid crystal cell 13, in addition to having scattering properties. Therefore, a portion occupied by the adhesive layer (the adhesive is not shown in FIG. 1) in the reflection-type LCD of the first exemplary embodiment becomes unnecessary, and an overall thickness of the reflection-type LCD is reduced by this portion.

As the method of providing adhesiveness to the scattering layer 10, there is available such a method as adding so-called tackifier (cohesion adding agent), i.e. such material as natural resin, low molecular weight synthetic resin, liquid rubber, and the like, into the resin composing an ordinary scattering layer.

In addition, there is another method that uses such a resin having inherent adhesiveness as the resin material for the scattering layer 10. A variety of resins having adhesiveness are available such as acrylic ester of various kinds, and polymers and copolymers of various vinyl monomers. Some of the specific examples include homopolymers and copolymers of alkyl-acrylate, ethylene-acetic acid vinyl copolymers, and the like. The scattering layer 10 having adhesiveness can be composed by dispersing fine particles of inorganic or organic substance of various kinds into the above-described resin. Moreover, any of the above copolymers can be provided with scattering properties by adjusting copolymeric composition without adding fine particles of the inorganic or organic substance.

A similar effect as described in the first exemplary embodiment can be achieved by using a scattering layer having such scattering characteristic that the diffuse reflection factor "R" is 7% or greater but 110% or less to incident light of any incident angle from 25° to 45°, as the scattering layer 10 of the reflection-type LCD constructed as above. Furthermore, an effect obtainable by using a scattering layer having a total light transmission factor of 80% or greater, and/or a scattering layer having an isotropic scattering characteristic is also same as what is described in the first exemplary embodiment. The adhesive having the scattering properties can be made with the same method as the scattering layer used in the first exemplary embodiment.

The reflection-type LCD of this exemplary embodiment provides such advantages as reducing blur of an image, and producing even a clearer image, since it results in a shorter distance between the scattering layer and a reflecting surface as compared with that of the reflection-type LCD of the first exemplary embodiment.

Further, the reflection-type LCD of this exemplary embodiment can be reduced in overall thickness of the reflection-type LCD as compared with the reflection-type LCD of the first exemplary embodiment, as described above.

In the foregoing first and second exemplary embodiments, although the reflection-type LCD of this invention has been described by referring to the example shown in FIG. 1, the invention is not limited to these modes. It can also provide a similar effect for a reflection-type LCD and the like that employ an active drive by thin-film transistors (TFT) for instance. Again, although silver was used as a mirror reflection electrode 18 in embodied examples described below, this is not restrictive. A similar effect can be achieved, even if a reflection electrode of other metal is used, including aluminum for example.

Figure 4A:
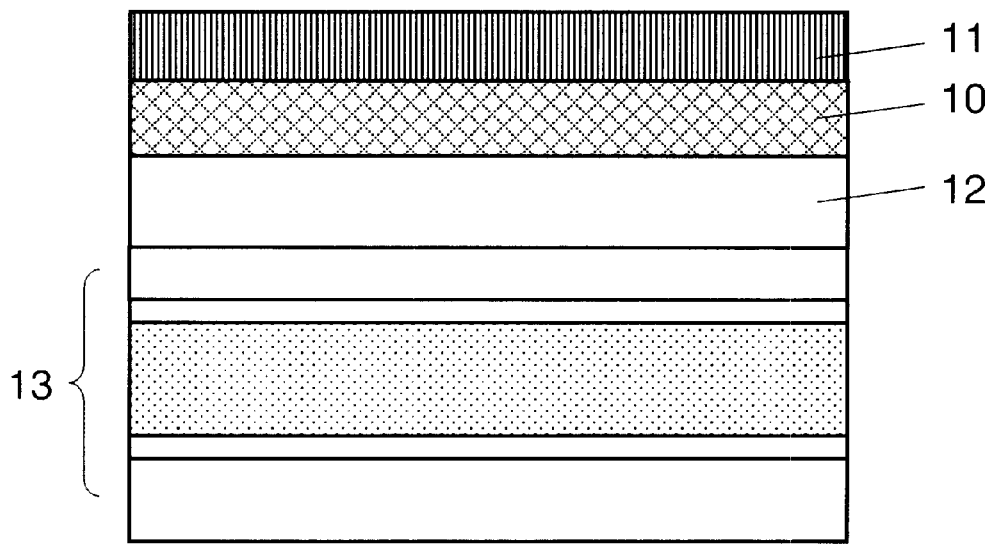
FIG. 4 is a sectional view of a modified example of the reflection-type LCD of the first and the second exemplary embodiments of this invention.
Figure 4B:
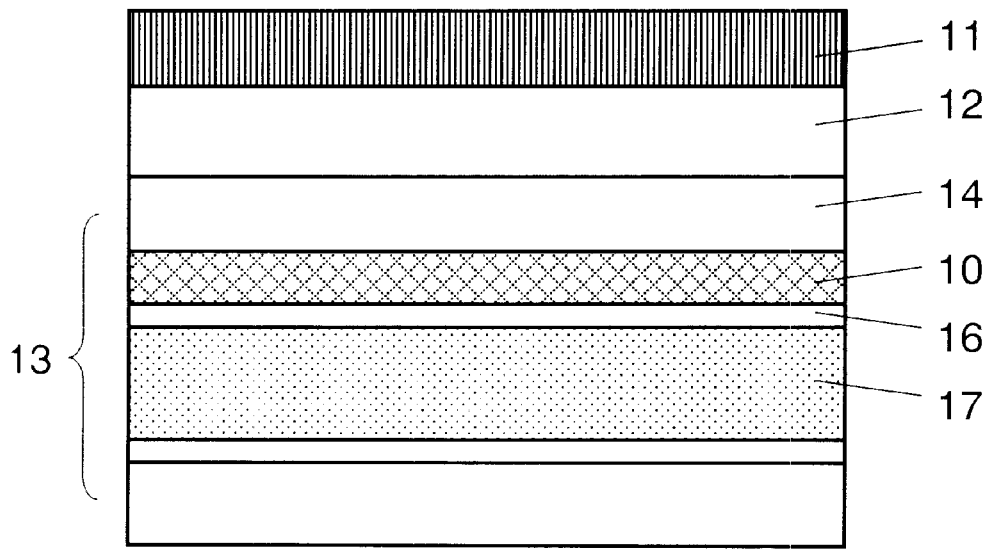
Figure 5:
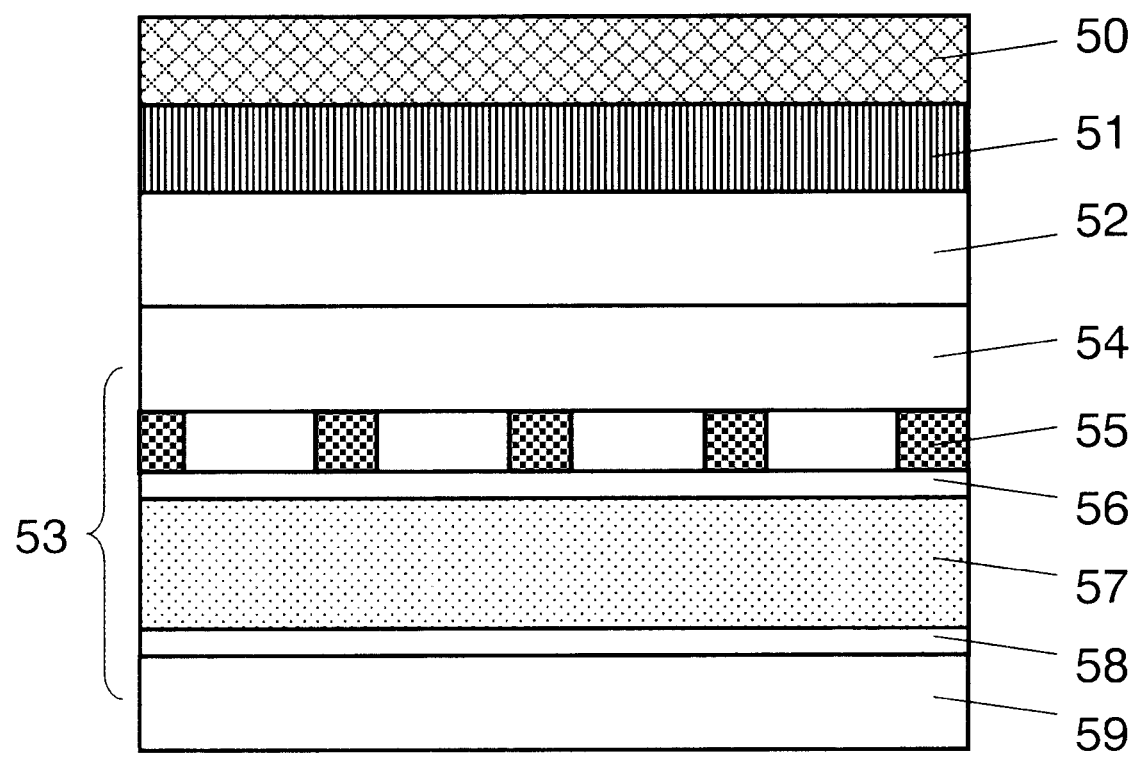
FIG. 5 is a sectional view of a reflection-type LCD of the prior art.
Figure 6:
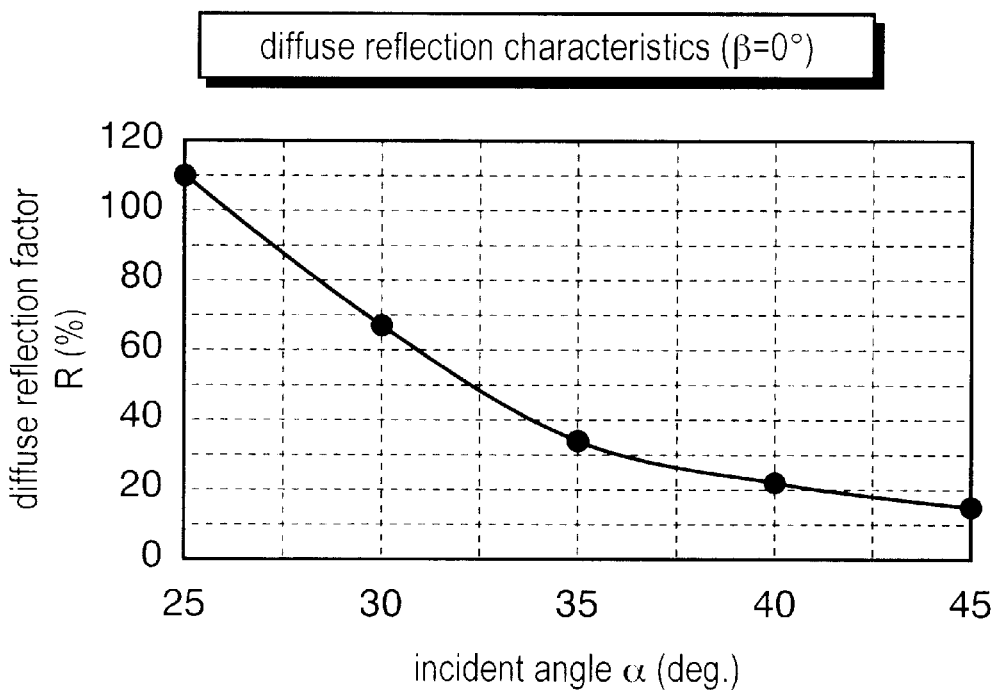
FIG. 6 is a graphical representation of scattering characteristic of a scattering layer of a reflection-type LCD of a second embodied example of this invention.
Figure 7:
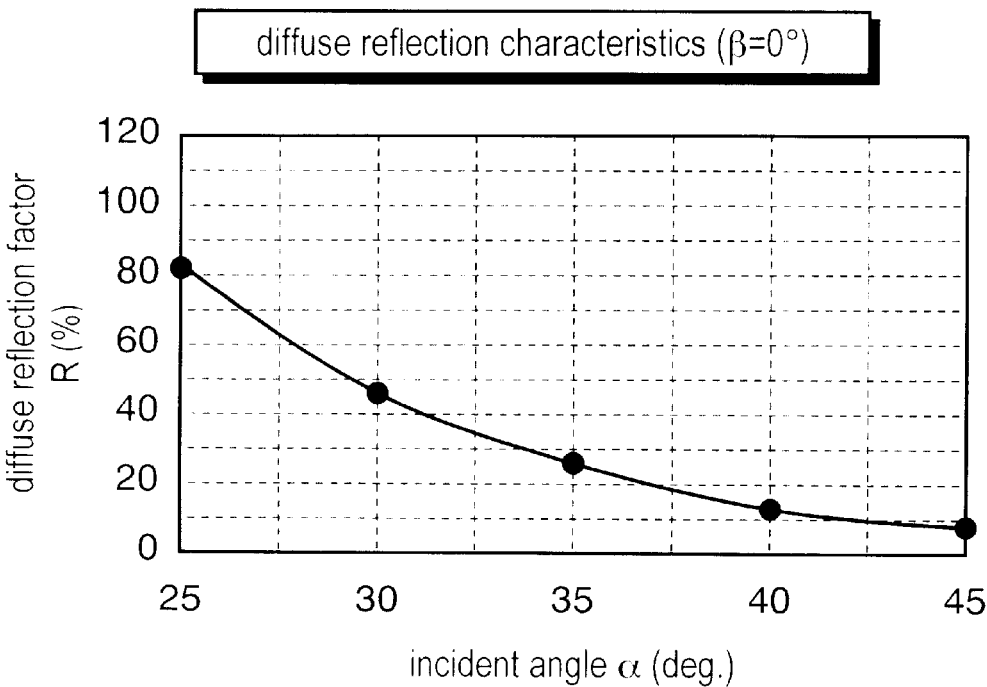
FIG. 7 is a graphical representation of scattering characteristic of a scattering layer of a reflection-type LCD of a third embodied examples of this invention.
Figure 8:
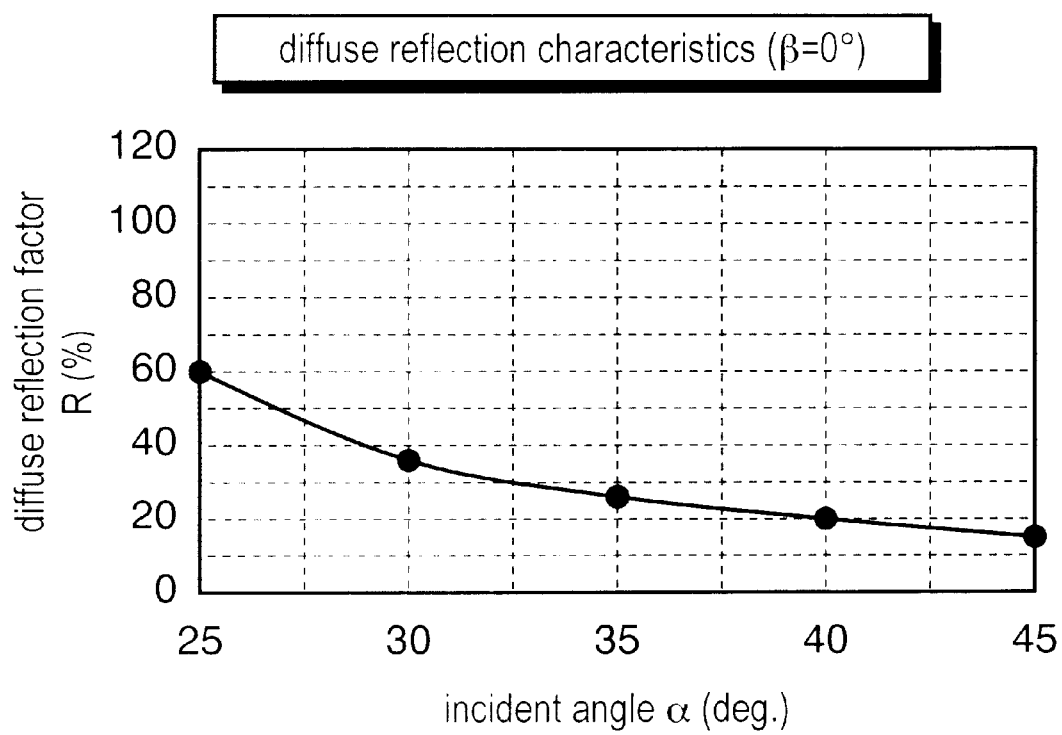
FIG. 8 is a graphical representation of scattering characteristic of a scattering layer of a reflection-type LCD of a fourth embodied example of this invention.
Figure 9:
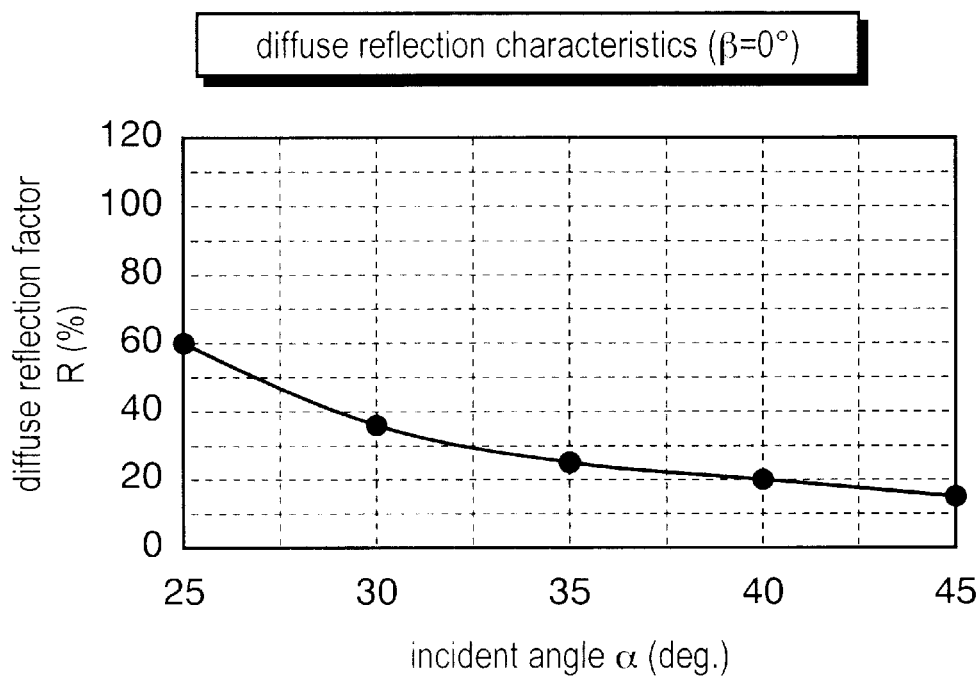
FIG. 9 is a graphical representation of scattering characteristic of a scattering layer of a reflection-type LCD of a fifth embodied example of this invention.

Moreover, as shown in FIG. 1, the scattering layer 10 of this invention is arranged between the upper transparent substrate 14 and the birefringent film 12 in the above-described first and the second exemplary embodiments. This is not restrictive, however, and a similar effect is attainable even with other arrangements wherein the scattering layer 10 is placed between the polarizing film 11 and the birefringent film 12, as shown in FIG. 4(a), or the scattering layer 10 is placed between the upper transparent substrate 14 and the transparent electrode 16, as shown in FIG. 4(b), as a few of examples. Furthermore, although what has been described above is a case, in which one layer of the scattering layer 10 is used, this is not restrictive, and a similar effect can also be achieved with other structure comprising a plurality of scattering layers.

Embodied examples of this invention will now be described hereinafter. The following embodied examples correspond with the first and the second exemplary embodiments described above. What will be shown is a result of verification of the afore-mentioned effect, performed on the reflection-type LCD's prepared respectively with embodied examples of the scattering layer corresponding respectively with the above exemplary embodiments, and others of their comparison examples.

First through Fifth Embodied Examples and First through Third Comparative Examples Glass substrates were used as the substrate 14 and the substrate 19. A pigment dispersion type color filter 15 arranged as a stripe pattern of red, green and blue was formed on the substrate 14 with the photolithography method. A pixel electrode was then formed on top of it with a transparent electrode 16 composed of indium tin oxide (ITO).

Further, a metallic reflection electrode 18 was formed over the lower substrate 19 by depositing silver with vacuum evaporation. In addition, alignment layers were formed on the transparent electrode 16 and the metallic reflection electrode 18, and they were aligned thereafter with a rubbing process.

The substrate 14 and the substrate 19 were bonded together, after printing thermosetting sealing resin mixed with glass fiber around perimeter of the substrate 14, and spreading resin beads of 4.5 μm in diameter on the substrate 19. The sealing resin was cured at a temperature of 150° C. Afterwards, it was vacuum injected with nematic liquid crystal of the ester group having Δn=0.14. An injection opening was sealed with ultraviolet-setting resin, which was then cured by ultraviolet rays to compete a liquid crystal cell 13.

A scattering layer 10 was adhered onto the substrate 14 of the liquid crystal cell 13 constructed as above. The scattering layer 10 used here was a material having a total light transmission factor of 90%, an isotropic scattering characteristic, and a haze ratio of 55% for departing light without dependent on an incidence angle of the incident light. Here, the haze ratio is defined as a value derived by (scattered light transmission factor)/(total light transmission factor)×100 (%). The scattering characteristic of the scattering layer 10 differs from one after another among the individual embodied examples and the comparison examples.

A birefringent film layer 12 having a retardation value of 490 nm was bonded on the scattering layer 10 in a manner that a slow axis is orthogonal to a rubbing direction of the substrate 14. In addition, the polarizing film 11 was bonded on top of them in an orientation that an absorption axis forms an angle of 45 degrees with respect to the rubbing direction of the upper transparent substrate 14.

The embodied examples and the comparison examples corresponding to the reflection-type LCD of the first exemplary embodiment were thus manufactured through the procedures as described above. They are the reflection-type color LCD's of normally black mode that show black display when no voltage is applied.

Figure 3:
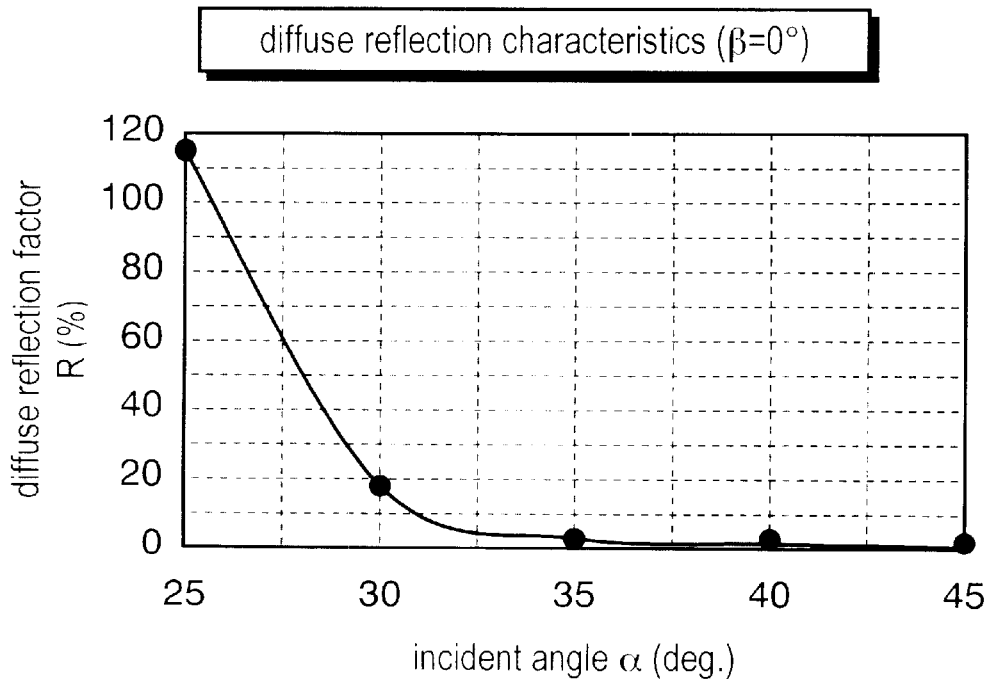
FIG. 3 is a graphical representation of scattering characteristic of a scattering layer of a reflection-type LCD of a first comparison example in this invention.
Figure 10:
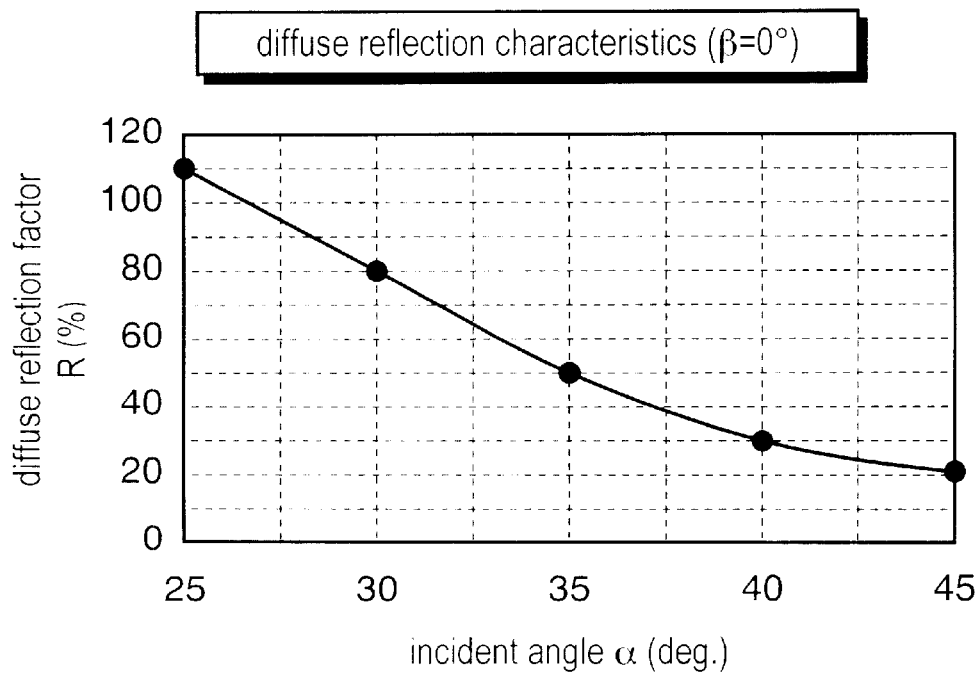
FIG. 10 is a graphical representation of scattering characteristic of a scattering layer of a reflection-type LCD of a second comparison example.
Figure 11:
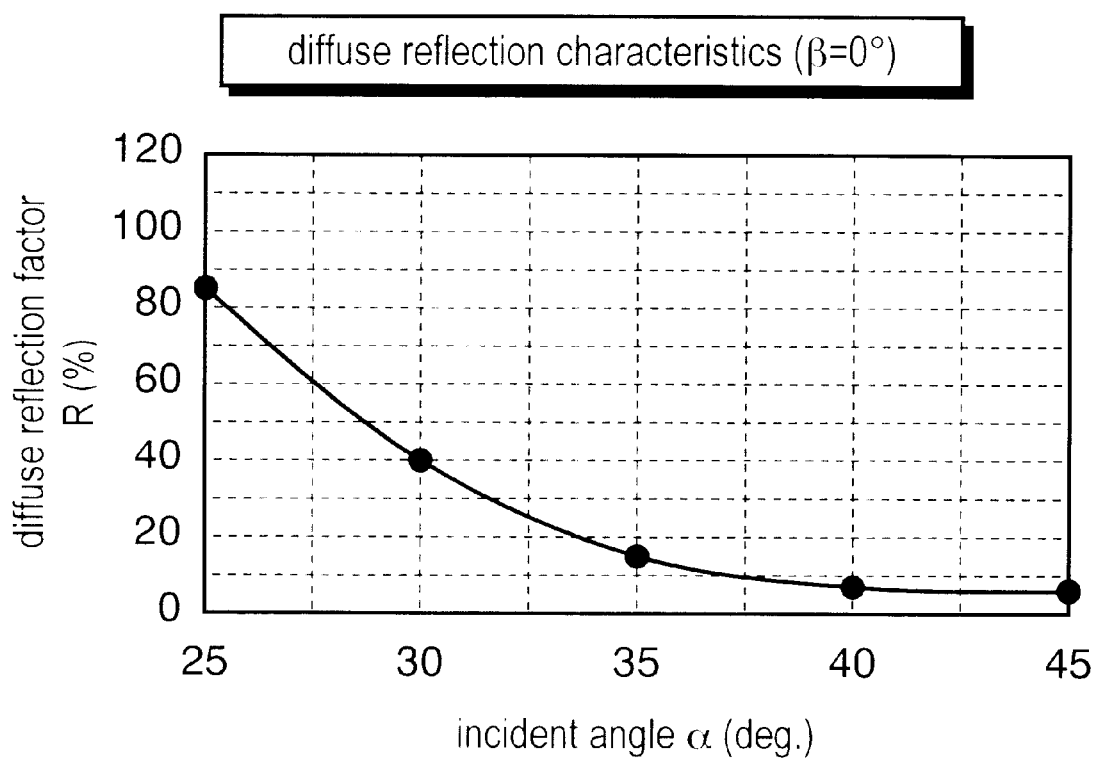
FIG. 11 is a graphical representation of scattering characteristic of a scattering layer of a reflection-type LCD of a third comparison example.
Figure 12:
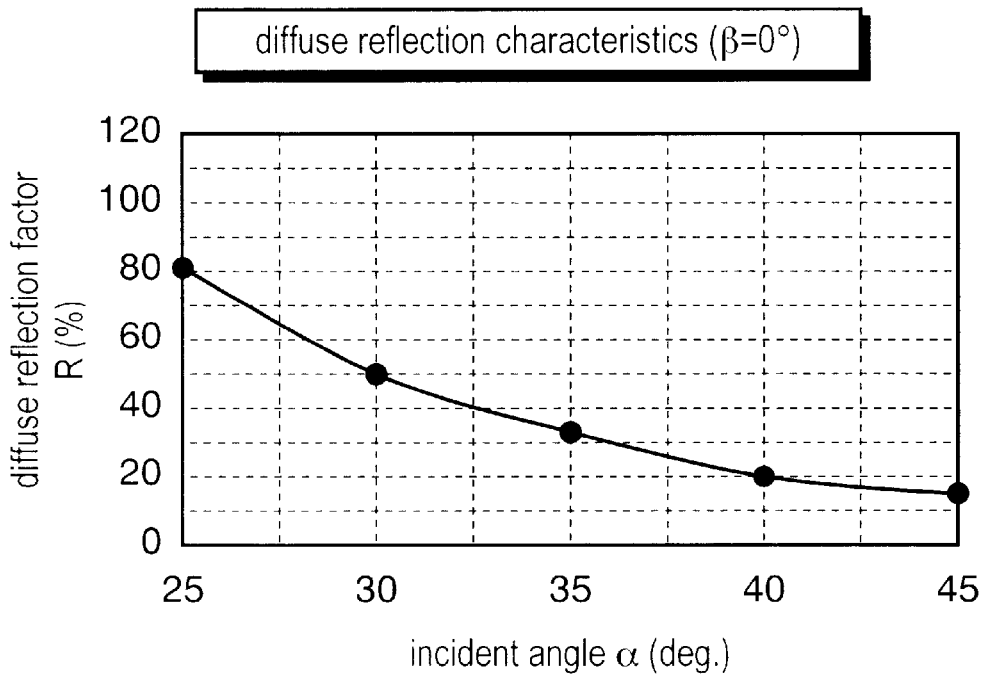
FIG. 12 is a graphical representation of scattering characteristic of a scattering layer of a reflection-type LCD of a sixth embodied example of this invention.
Figure 13:
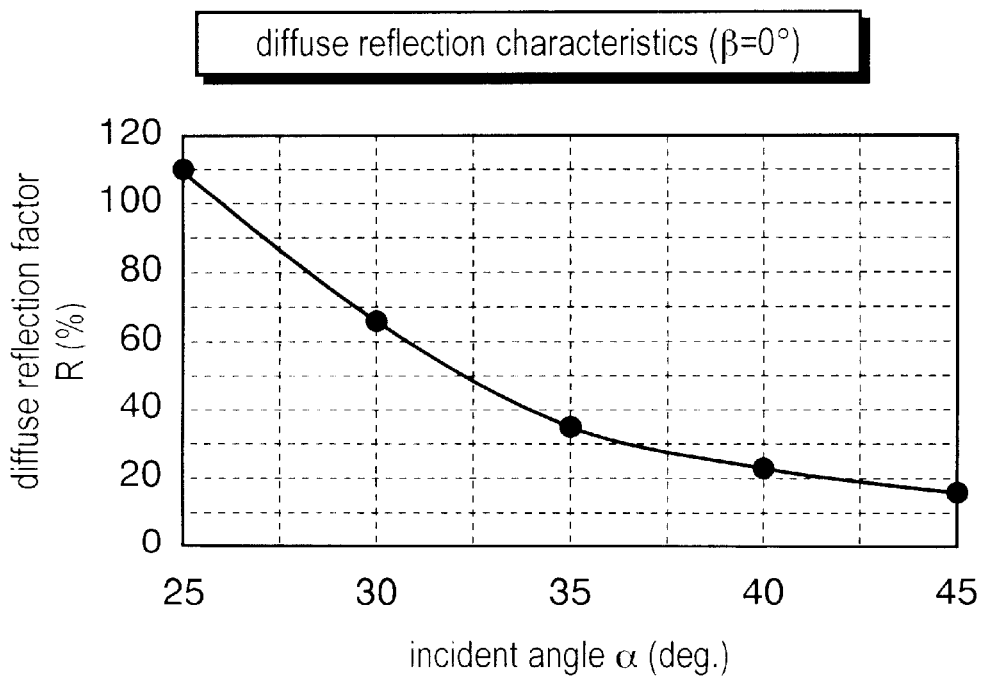
FIG. 13 is a graphical representation of scattering characteristic of a scattering layer of a reflection-type LCD of a seventh embodied example of this invention.
Figure 14:
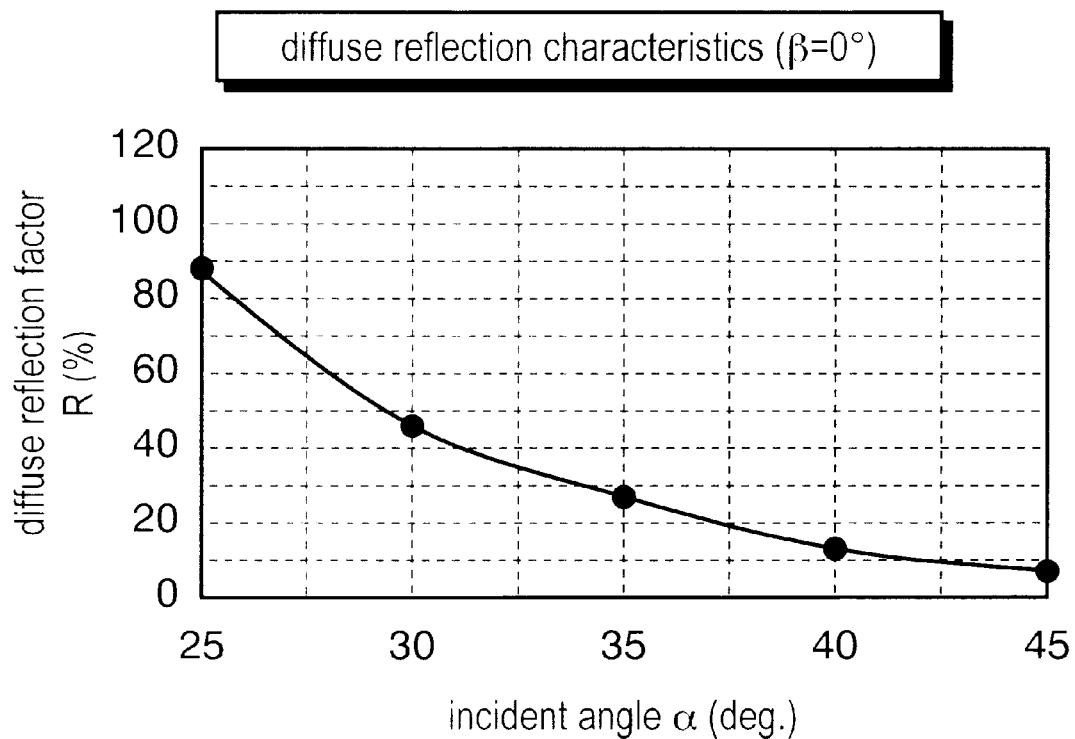
FIG. 14 is a graphical representation of scattering characteristic of a scattering layer of a reflection-type LCD of an eighth embodied example of this invention.
Figure 15:
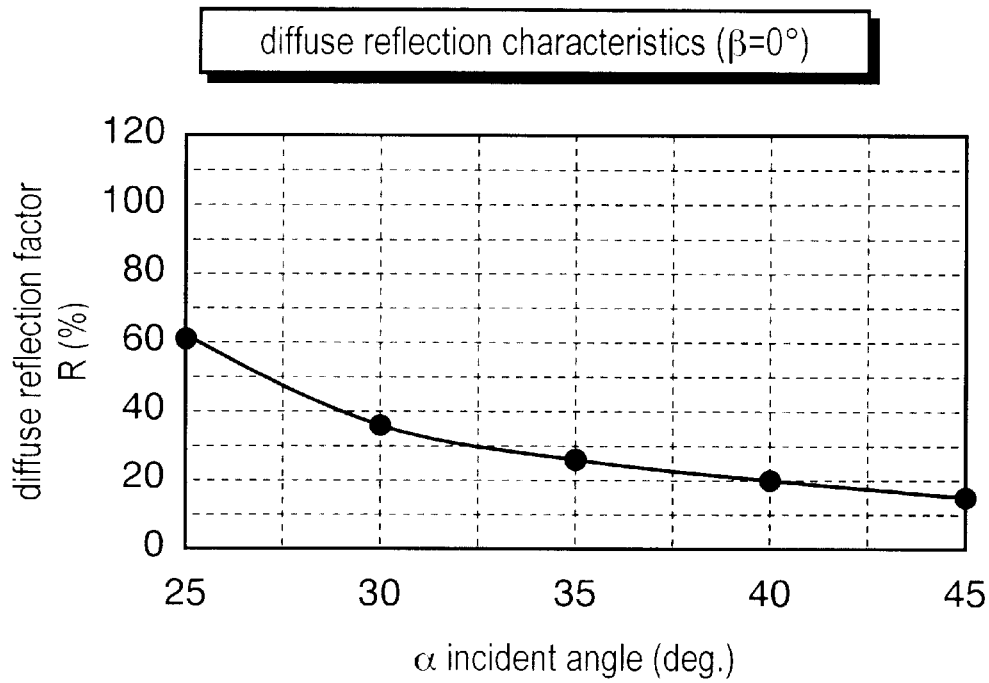
FIG. 15 is a graphical representation of scattering characteristic of a scattering layer of a reflection-type LCD of a ninth embodied example of this invention.
Figure 16:
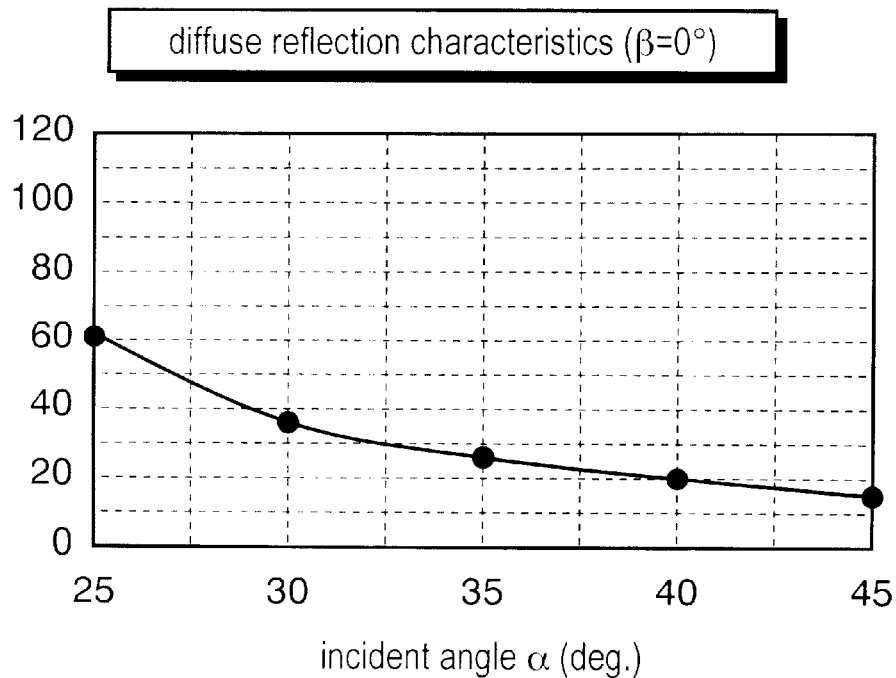
FIG. 16 is a graphical representation of scattering characteristic of a scattering layer of a reflection-type LCD of a tenth embodied example of this invention.
Figure 17:
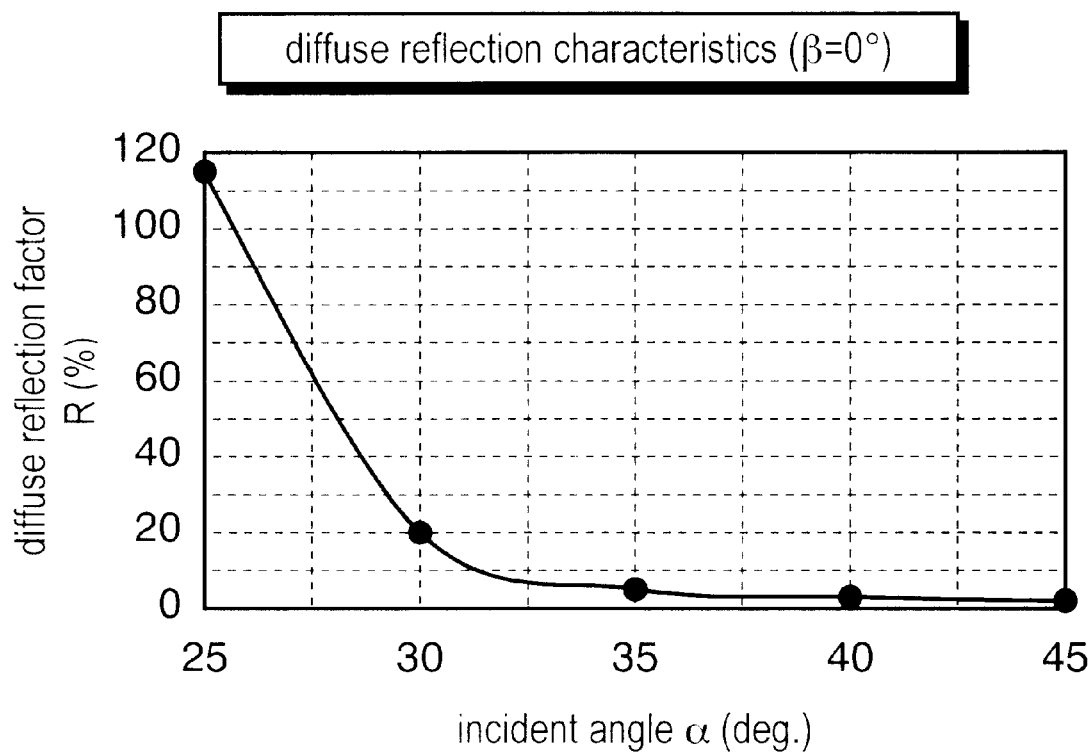
FIG. 17 is a graphical representation of scattering characteristic of a scattering layer of a reflection-type LCD of a fourth comparison example.
Figure 18:
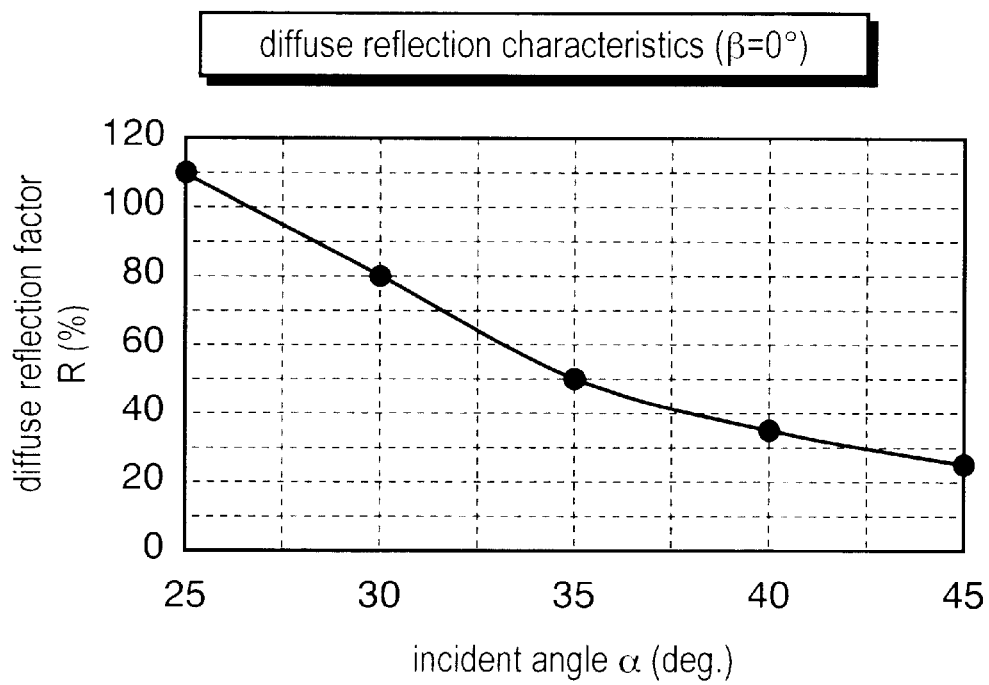
FIG. 18 is a graphical representation of scattering characteristic of a scattering layer of a reflection-type LCD of a fifth comparison example.
Figure 19:
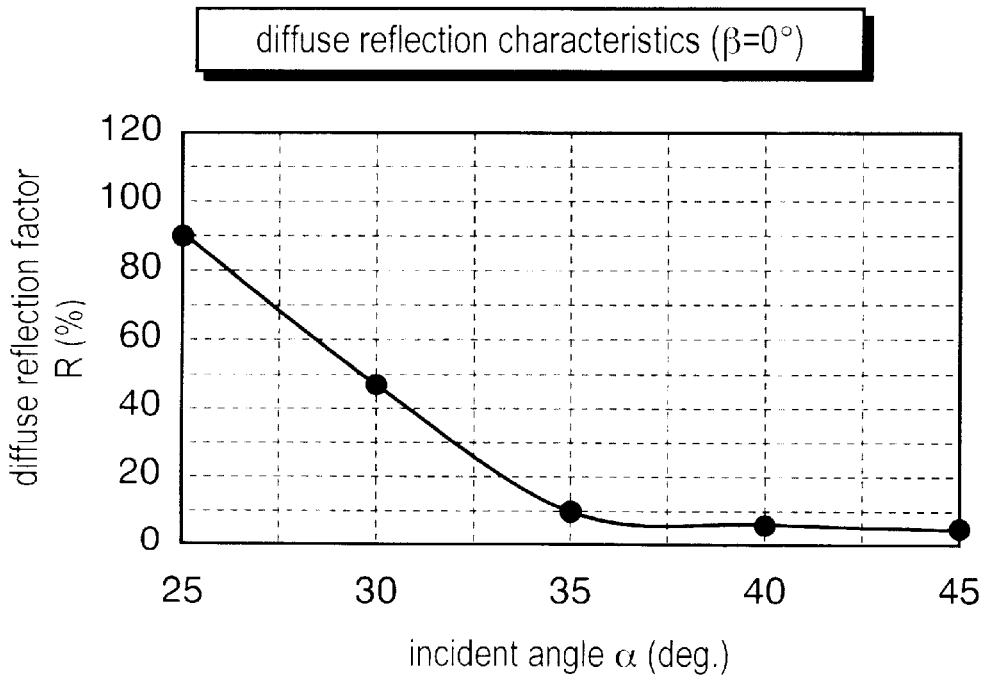
FIG. 19 is a graphical representation of scattering characteristic of a scattering layer of a reflection-type LCD of a sixth comparison example.

FIG. 2, FIG. 3, and FIG. 6 through FIG. 11 show characteristics representing the diffuse reflection factors of the scattering layers of individual embodied examples and the comparison examples. FIG. 2, FIG. 6, FIG. 7, FIG. 8, and FIG. 9 correspond respectively to the first embodied example, the second embodied example, the third embodied example, the fourth embodied example, and the fifth embodied example. FIG. 3, FIG. 10, and FIG. 11 also correspond respectively to the first comparison example, the second comparison example, and the third comparison example.

Table 1 shows a result of measurement of "R" of the scattering layer at incident angles from 25° to 45°, a contrast in the front characteristic, and a reflection factor converted into "Y" value of the white display for each of the embodied examples and the comparison examples.

TABLE 1

| | "R" | | "R" | Contrast (Front | Reflection |
| | Lowest Limit Value | Highest Limit Value | Incident Angle: 25° | Characteristic) | Factor |
|---|---|---|---|---|---|
| 1st Embodied Example | 15% | 82% | 82% | 10.3 | 12.5% |
| 2nd Example | 15 | 110 | 110 | 11.7 | 14.0 |
| 3rd Example | 7 | 83 | 83 | 9.0 | 11.3 |
| 4th Example | 15 | 60 | 60 | 7.9 | 10.6 |
| 5th Example | 15 | 59 | 59 | 6.8 | 9.8 |
| 1st Comp. Example | 2 | 115 | 115 | 4.0 | 6.8 |
| 2nd Example | 20 | 111 | 111 | 3.2 | 14.8 |
| 3rd Example | 6 | 85 | 85 | 5.1 | 9.1 |

As is obvious from Table 1, favorable characteristics were obtained for the first through the fifth embodied examples, in that they satisfy the "R" values of 7% or greater but 110% or smaller at the incident angle of 25° to 45°, the contrasts in the front characteristic lie within 6.8 and 11.7 (a criterion of good contrast is 5.0 or greater), and the reflection factors converted into "Y" value of white display lie within 9.8% and 14.0% (a criterion of good white display is 10% or higher). Moreover, an excellent result was also obtained for the change in reflection factor with respect to dependency on the viewing angle.

On the contrary, satisfiable contrasts and/or good white displays could not be obtained for the first through the third comparison examples, of which the "R" values do not meet the above criterion at the incident angle of 25° to 45°, as the result shows the contrasts in the front characteristic being between 3.2 and 5.1, and the reflection factors converted into "Y" value of white display being between 6.8% and 14.8%. In addition, a clear image could not be obtained, as blur was seen in the image.

Besides, the first through the fourth embodied examples exhibited the "R" values of 60% and greater at the incident angle of 25°, and both the contrasts in the front characteristic and the reflection factors converted into "Y" value of white display were superior than the fifth embodied example, of which the "R" value was less than 60%.

As shown above, good contrasts and excellent white displays were obtained, when the "R" satisfied 7% or greater but 110% or smaller at the incident angle of 25° to 45°, and when the "R" was 60% or greater at the incident angle of 25°.

Sixth through Tenth Embodied Examples and Fourth through Sixth Comparative Examples Described hereinafter pertains to embodied examples and comparison examples corresponding to the reflection-type LCD of the second exemplary embodiment.

A method of manufacturing the reflection-type LCD's of the sixth through the tenth embodied examples and the fourth through the sixth comparison examples is similar to that of the first through the fifth embodied examples and the first through the third comparison examples, except that the scattering layer 10 serves as the adhesive for bonding together the birefringent film 12 and the liquid crystal cell 13.

The scattering layer 10 used here is a material having a total light transmission factor of 90%, an isotropic scattering characteristic, and a haze ratio of 56% for departing light without dependent on an incidence angle of the incident light. In addition, a scattering characteristic of the scattering layer 10 of these embodied examples is generally similar to the characteristic of the diffuse reflection factor shown in FIG. 2. A thickness of the scattering layer is 25 μm.

FIG. 12 through FIG. 19 show characteristics representing the diffuse reflection factors of the scattering layers of individual embodied examples and the comparison examples. FIG. 12, FIG. 13, FIG. 14, FIG. 15, FIG. 16, FIG. 17, FIG. 18, and FIG. 19 correspond respectively to each of the sixth embodied example, the seventh embodied example, the eighth embodied example, the ninth embodied example, the tenth embodied example, the fourth comparison example, the fifth comparison example, and the sixth comparison example.

Table 2 shows a result of measurement of "R" of the scattering layer at incident angles from 25° to 45°, a contrast in the front characteristic, and a reflection factor converted into "Y" value of the white display for each of the embodied examples and the comparison examples.

TABLE 2

| | "R" | | "R" | Contrast (Front Charac- teristic) | Reflection Factor |
|---|---|---|---|---|---|
| | Lowest Limit Value | Highest Limit Value | Incident Angle: 25° | | |
| 6th Embodied Example | 15% | 82% | 82% | 10.3 | 12.5% |
| 7th Example | 16 | 110 | 110 | 11.7 | 14.1 |
| 8th Example | 7 | 87 | 87 | 9.1 | 11.7 |
| 9th Example | 14 | 60 | 60 | 8.7 | 10.5 |
| 10th Example | 14 | 59 | 59 | 7.9 | 9.8 |
| 4th Comp. Example | 2 | 115 | 115 | 3.5 | 5.1 |
| 5th Example | 24 | 111 | 111 | 2.8 | 15.3 |
| 6th Example | 6 | 90 | 90 | 4.0 | 7.8 |

As is obvious from Table 2, favorable characteristics were obtained for the sixth through the tenth embodied examples, in that they satisfy the "R" values of 7% or greater but 110% or smaller at the incident angle of 25° to 45°, the contrasts in the front characteristic lie within 7.9 and 11.7, and the reflection factors converted into "Y" value of white display lie within 9.8% and 14.1%. Moreover, an excellent result was also obtained for the change in reflection factor with respect to dependency on the viewing angle.

On the other hand, satisfiable contrasts and/or good white displays could not be obtained for the fourth through the sixth comparison examples, of which the "R" values do not meet the above criterion at the incident angle of 25° to 45°, as the result shows the contrasts in the front characteristic being between 2.8 and 4.0, and the reflection factors converted into "Y" value of white display being between 5.1% and 15.3%. In addition, a clear image could not be obtained, as blur was seen in the image.

Further, the sixth through the ninth embodied examples exhibited the "R" values of 60% and greater at the incident angle of 25°, and both the contrasts in the front characteristic and the reflection factors converted into "Y" value of white display were superior than the tenth embodied example, of which the "R" value was less than 60%.

As the above results indicate, satisfiable effects similar to those of the first exemplary embodiment were verified even if the scattering layer also serves as an adhesive layer.

It was confirmed, based on a comparison of overall thicknesses of the reflection-type LCD's of the sixth through the tenth embodied examples with overall thicknesses of the reflection-type LCD's of the first through the fifth embodied examples, that those of the sixth through the tenth embodied examples are thinner by approximately 150 μm.

INDUSTRIAL APPLICABILITY

As has been obvious from the foregoing details, the present invention is able to provide a reflection-type LCD, which is bright in white display, capable of producing a high contrast, and reducing blur of an image. Furthermore, it can reduce a thickness of the reflection-type LCD by adopting a composition that renders a scattering layer to also serve as an adhesive layer.

Because of the above advantages, the present invention provides an extraordinary fine reflection-type LCD for general use including a mobile usage and the like.

What is claimed is:

1. A reflection-type liquid crystal display device comprising:
   a liquid crystal cell;
   a polarizing film;
   a birefringent film;
   a scattering layer; and
   a light reflection means,
   wherein said scattering layer has a diffuse reflection factor "R" of 7% or greater but 110% or less when an incident angle of light is within a range of 25° and 45°, provided that said diffuse reflection factor "R" is defined according to the formula

"R"=R1/R2×100 where
   R1 is a reflection factor in a direction of the normal line of an object when light is irradiated at an incident angle of 0° to said object adhered onto an aluminum mirror reflection plate having a reflection factor of 91% in a direction of the normal line thereof to incident light of 546 nm in wave length at an incident angle of 0°, and
   R2 is a reflection factor in a direction of the normal line of an MgO layer when light is irradiated to said MgO layer at an incident angle of 25°, said MgO layer having a thickness equal to that of said object and adhered to said aluminum mirror reflection plate.

2. The reflection-type liquid crystal display device as set forth in claim 1, wherein said diffuse reflection factor "R" of said scattering layer is 60% or greater at an incident angle of 25°.

3. The reflection-type liquid crystal display device as set forth in claim 2, wherein a total light transmission factor of said scattering layer is 80% or greater.

4. The reflection-type liquid crystal display device as set forth in claim 3, wherein scattering characteristic of said scattering layer is isotropic.

5. The reflection-type liquid crystal display device as set forth in claim 2, wherein scattering characteristic of said scattering layer is isotropic.

6. The reflection-type liquid crystal display device as set forth in claim 1, wherein a total light transmission factor of said scattering layer is 80% or greater.

7. The reflection-type liquid crystal display deice as set forth in claim 6, wherein scattering characteristic of said scattering layer, is isotropic.

8. The reflection-type liquid crystal display device as set forth in claim 1, wherein scattering characteristic of said scattering layer is isotropic.

9. A reflection-type liquid crystal display device comprising;
- a liquid crystal cell;
- a polarizing film;
- a birefringent film;
- a scattering layer; and
- a light reflection means,
- wherein said scattering layer is provided with adhesiveness, and has a diffuse reflection factor "R" of 7% or greater but 110% or less when an incident angle of light is within a range of 25° and 45°, provided that said diffuse reflection factor "R" is defined according to the formula

"R"=R1/R2×100 where
  R1 is a reflection factor in a direction of the normal line of an object when light is irradiated at an incident angle of 0° to said object adhered onto an aluminum mirror reflection plate having a reflection factor of 91% in a direction of the normal line to incident light of 546 nm in wave length at an incident angle of 0°, and R2 is a reflection factor in a direction of the normal line of an MgO layer when light is irradiated to said MgO layer at an incident angle of 25°, said MgO layer having a thickness equal to that of said object and adhered to said aluminum mirror reflection plate.

10. The reflection-type liquid crystal display device as set forth in claim 9, wherein said diffuse reflection factor "R" of said scattering layer is 60% or greater at an incident angle of 25°.

11. The reflection-type liquid crystal display deice as set forth in claim 10, wherein a total light transmission factor of said scattering layer is 80% or greater.

12. The reflection-type liquid crystal display device as set forth in claim 11, wherein scattering characteristic of said scattering layer is isotropic.

13. The reflection-type liquid crystal display device as set forth in claim 10, wherein scattering characteristic of said scattering layer is isotropic.

14. The reflection-type liquid crystal display de ice as set forth in claim 9, wherein a total light transmission factor of said scattering layer is 80% or greater.

15. The reflection-type liquid crystal display device as set forth in claim 14, wherein scattering characteristic of said scattering layer is isotropic.

16. The reflection-type liquid crystal display device as set forth in claim 9, wherein scattering characteristic of said scattering layer is isotropic.

* * * * *

UNITED STATES PATENT AND TRADEMARK OFFICE
CERTIFICATE OF CORRECTION

PATENT NO. : 6,404,471 B1
DATED : June 11, 2002
INVENTOR(S) : Hatanaka et al.

It is certified that error appears in the above-identified patent and that said Letters Patent is hereby corrected as shown below:

<u>Title page,</u>
Item [56], FOREIGN PATENT DOCUMENTS, insert the following:
-- JP    10-206837    8/1998
   JP    7-56157      3/1995
   JP    7-234402     9/1995
   JP    8-338993     12/1996
   JP    10-332911    12/1998
   JP    8-201802     8/1996 --

<u>Drawings,</u>
Delete the last sheet of figures, also labeled as "Reference Numerals"

<u>Column 10,</u>
Line 60, "2" should read -- 1 --.
Line 63, "3" should read -- 1 --.

<u>Column 11,</u>
Line 2, "1" should read -- 2 --.
Line 4, "deice" should read -- device --.
Line 8, "1" should read -- 3 --.

<u>Column 12,</u>
Line 10, "deice" should read -- device --.
Line 19, "de ice" should read -- device --.

Signed and Sealed this

Sixth Day of May, 2003

JAMES E. ROGAN
*Director of the United States Patent and Trademark Office*